(12) United States Patent
White et al.

(10) Patent No.: US 10,612,599 B2
(45) Date of Patent: Apr. 7, 2020

(54) BEARING SEAL WITH INTEGRATED GROUNDING SHUNT

(71) Applicant: Schaeffler Technologies AG & Co. KG, Herzogenaurach (DE)

(72) Inventors: Michael White, Lake Wylie, SC (US); Scott Hart, Sharon, SC (US); Chris Hutchison, Gastonia, NC (US)

(73) Assignee: SCHAEFFLER TECHNOLOGIES AS & CO. KG, Herzogenaurach (DE)

( * ) Notice: Subject to any disclaimer, the term of this patent is extended or adjusted under 35 U.S.C. 154(b) by 0 days.

(21) Appl. No.: 16/128,660

(22) Filed: Sep. 12, 2018

(65) Prior Publication Data

US 2020/0080597 A1 Mar. 12, 2020

(51) Int. Cl.
| | | |
|---|---|---|
| F16C 41/00 | (2006.01) | |
| F16C 19/10 | (2006.01) | |
| H01R 4/64 | (2006.01) | |
| F16C 33/78 | (2006.01) | |
| H01R 4/18 | (2006.01) | |
| H01R 4/70 | (2006.01) | |

(52) U.S. Cl.
CPC ............ *F16C 41/002* (2013.01); *F16C 19/10* (2013.01); *F16C 33/784* (2013.01); *H01R 4/64* (2013.01); *H01R 4/182* (2013.01); *H01R 4/70* (2013.01)

(58) Field of Classification Search
CPC ........ F16C 19/06; F16C 19/52; F16C 33/784; F16C 33/7843; F16C 33/7853; F16C 33/7856; F16C 33/7889; F16C 41/002
See application file for complete search history.

(56) References Cited

U.S. PATENT DOCUMENTS

| | | | | |
|---|---|---|---|---|
| 3,564,477 | A | * | 2/1971 | Pompei ............... F16C 33/7843 439/17 |
| 3,994,545 | A | | 11/1976 | Van Dom |
| 5,139,425 | A | | 8/1992 | Daviet et al. |
| 6,142,673 | A | | 11/2000 | Kottritsch et al. |
| 7,136,271 | B2 | | 11/2006 | Oh et al. |

(Continued)

FOREIGN PATENT DOCUMENTS

| | | |
|---|---|---|
| EP | 0787915 A1 | 8/1997 |
| JP | H09310721 A | 12/1997 |

(Continued)

OTHER PUBLICATIONS

Technical Bulletin. Pro Tech SG Bearing Isolators. Parker Hannifin Corporation, Cleveland, OH. dated 2006.

(Continued)

*Primary Examiner* — Phillip A Johnson
(74) *Attorney, Agent, or Firm* — Volpe and Koenig, P.C.

(57) ABSTRACT

A rolling bearing assembly has a first ring including a first race, a second ring including a second race, and a plurality of rolling elements in rolling contact with the first and second races. The rolling bearing assembly also has a sealing assembly including a first end in contact with the first ring and a second end in contact with the second ring. The sealing assembly has a shield, a sealing element, and a grounding element. The grounding element and the shield combine to provide an electrically conductive path between the first ring and the second ring. The grounding element and the sealing element combine to seal between the first ring and the second ring.

18 Claims, 2 Drawing Sheets

(56) References Cited

U.S. PATENT DOCUMENTS

| | | | |
|---|---|---|---|
| 7,193,836 | B2 | 3/2007 | Oh et al. |
| 7,498,703 | B2 | 3/2009 | Rea et al. |
| 7,878,814 | B2 | 2/2011 | Chin et al. |
| 8,169,766 | B2 | 5/2012 | Oh et al. |
| 8,199,453 | B2 | 6/2012 | Oh et al. |
| 8,248,725 | B2 | 8/2012 | Hendriks et al. |
| 8,432,659 | B2 | 4/2013 | Oh et al. |
| 8,632,251 | B2 * | 1/2014 | Moratz ............ F16C 33/7843 384/476 |
| 9,175,728 | B2 | 11/2015 | White |
| 9,464,672 | B2 * | 10/2016 | White ............... F16C 33/7843 |
| 9,581,203 | B2 * | 2/2017 | White ............... F16C 41/002 |
| 9,790,995 | B2 * | 10/2017 | White ............... F16C 19/52 |
| 2004/0233592 | A1 | 11/2004 | King et al. |
| 2006/0007609 | A1 | 1/2006 | Oh et al. |
| 2008/0157478 | A1 | 7/2008 | Ishida et al. |
| 2010/0195946 | A1 | 8/2010 | Zhou et al. |
| 2011/0129176 | A1 | 6/2011 | Koma et al. |
| 2011/0317953 | A1 | 12/2011 | Moratz |
| 2012/0119448 | A1 | 5/2012 | Stewart et al. |
| 2013/0301971 | A1 | 11/2013 | Cudrnak et al. |
| 2014/0334758 | A1 | 11/2014 | White |
| 2016/0215824 | A1 | 7/2016 | Gezault et al. |

FOREIGN PATENT DOCUMENTS

| | | | |
|---|---|---|---|
| JP | 2008286229 A * | 11/2008 | .......... F16C 33/7863 |
| WO | 2009056098 A1 | 5/2009 | |
| WO | WO-2009056098 A1 * | 5/2009 | .............. F16C 33/30 |

OTHER PUBLICATIONS

Complete Shaft Grounding Solutions—INPRO/SEAL A Dover Company. Date Unknown (admitted prior art).

SKF Shaft Grounding Ring Kits TKGR series. dated Apr. 2012.

Shaft Grounding. Electro Static Technology—ITW—AEGIS Bearing Protection Ring—Patented Technology. dated 2009.

* cited by examiner

BEARING SEAL WITH INTEGRATED GROUNDING SHUNT

FIELD OF INVENTION

The present invention relates to a bearing assembly, and, more particularly, to electrical discharge damage protection for a rolling bearing assembly with a sealing assembly extending between outer and inner rings.

BACKGROUND

Rolling bearings are widely used in various mechanical applications, including automotive and industrial applications. Grounding devices are used to prevent shaft induced currents from causing electrical discharge machining (EDM) due to electrical currents passing through rolling bearing components. EDM causes pitting, fluting, and fusion craters on the rolling bearing components resulting in premature rolling bearing failure. Known EDM prevention methods include di-electric ceramic bearing coatings, Faraday shields, electrically conductive bearing grease, and shaft-contacting ground brushes.

Some current designs utilize a separate component to conduct electric current though a low impedance path parallel to the path through the rolling element bearing components. These alternative designs require additional components. Some of these designs utilize large additional components to the bearing that take up extra space or require additional assembly efforts to create the electrical connection to the ground. This requires more space outside of the bearing, additional components and extra assembly efforts.

SUMMARY

The present disclosure is directed to overcoming these and other problems of the prior art, including providing a grounding element which resists fracture during installation or use, providing sufficient di-electric strength, preventing excessive wear, lowers costs, and does not take up much additional space within the bearing assembly. The present disclosure is directed to a solution which is integrated within the sealing assembly of the rolling bearing, is in parallel to the bearing rolling element raceway capacitive interface, and maintains a near-constant electrical impedance during operation that is always less than the impedance of the bearing rolling element to raceway capacitive interface.

In one aspect, the present disclosure is directed to a bearing assembly. The bearing assembly includes a first ring including a first race, a second ring including a second race, a plurality of rolling elements in rolling contact with the first and second races, and a sealing assembly. The sealing assembly has a first end in contact with the first ring and a second end in contact with the second ring. The sealing assembly further has a grounding element in contact with the first ring, a shield having a free end in conducting proximity to the second ring, and a sealing element affixed to the grounding element and the shield. The grounding element and the shield create an electrically conductive path between the first ring and the second ring. The grounding element and the sealing element combine to seal between the first ring and the second ring.

In another aspect, the present disclosure is directed to a bearing assembly. The bearing assembly includes a first ring including a first race, a second ring including a second race, a plurality of rolling elements in rolling contact with the first and second races, and a sealing assembly. The sealing assembly has a first end in contact with the first ring and a second end in contact with the second ring. The sealing assembly further has a washer including a plurality of teeth in contact with the first ring, a shield in contact with the second ring, and a sealing element affixed to the grounding element and the shield. The grounding element and the shield create an electrically conductive path between the first ring and the second ring. The grounding element and the sealing element combine to seal between the first ring and the second ring.

In yet another aspect, the present disclosure is directed to a sealing assembly for sealing between a first ring and a second ring of a bearing. The sealing assembly includes a first end that contacts the first ring, a second end that contacts the second ring, a shield, a grounding element, and a sealing element. The shield contacts the first ring and extends into a groove of the second ring. The grounding element contacts the second ring. The sealing element contacts the second ring and the shield. The grounding element and the shield create an electrically conductive path between the first ring and the second ring. The shield and the sealing element provide a seal between the first ring and the second ring

BRIEF DESCRIPTION OF THE DRAWING(S)

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENT(S)

The present disclosure relates to a grounding element which is added to and/or integrated with the sealing or shielding assembly of a bearing in order to provide a grounding path for electrical currents. The sealing or shielding assembly is in contact with both the outer ring and the inner ring, functioning to seal between the rings while also providing the electrical grounding path.

Figure 1:
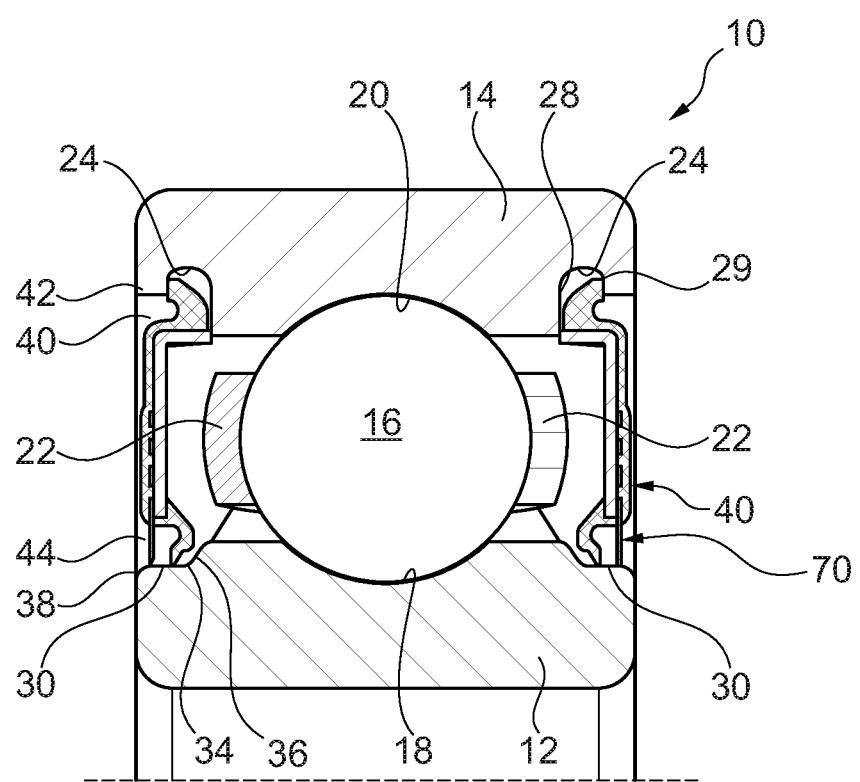
FIG. 1 is a cross-sectional view of a sealed bearing assembly whereby the sealing arrangement contains an integrated molded electrically conductive grounding element also referred to as an electrical shunt.
Figure 2:
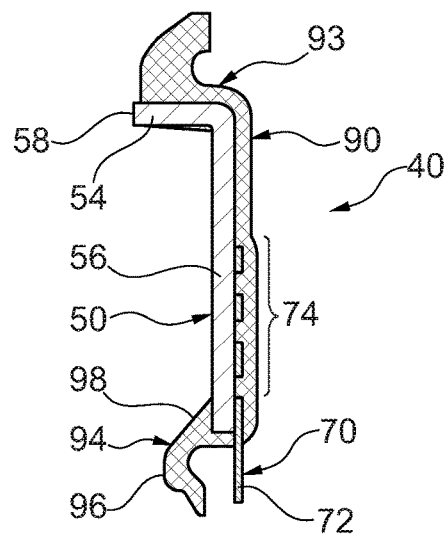
FIG. 2 is a partial side view of an electrically conductive grounding element of the sealing assembly of FIG. 1.

FIGS. 1 and 2 illustrate an exemplary embodiment of a bearing assembly 10. The bearing assembly 10 includes a first ring which can be a radially inner ring 12, a second ring which can be a radially outer ring 14, and a plurality of bearing elements 16 supported to roll on a radially inner race 18 of the radially inner ring 12 and a radially outer race 20 of the radially outer ring 14. The bearing elements 16 are preferably balls, but could include other configurations, such as needles, cylindrical rollers, tapered rollers, or spherical/barrel shaped rollers. The bearing assembly 10 further includes a cage 22 for the bearing elements 16. The bearing elements 16 may be rolling bearing elements, specifically balls.

Axial sides of the bearing assembly 10 each include a sealing assembly 40 extending between the radially inner ring 12 and the radially outer ring 14. The radially outer ring 14 preferably includes a groove 24 formed at each axial side for receiving the sealing assemblies. The grooves 24 are inward-facing (i.e., facing toward a center axis of the inner 12 and outer 14 rings) and are preferably curved to form a continuous groove surface. The grooves 24 extend from an axially inner face 28 positioned relatively nearer the bearing element 16 to an axially outer face 29 of the outer ring 14.

The radially inner rings 12 include contact surfaces 30 which face outwardly and radially oppose the grooves 24. The contact surfaces 30 may be formed as a ledge 34 which is positioned adjacent to a rising surface 36 which is closer to the bearing elements 16 (i.e., the rising surface 36 is axially inward of the ledge 34). On a side opposite from the rising surface 36, the ledge 34 is also adjacent to a chamfered edge 38 formed on an axially-outward side of the radially inner ring 12. In other embodiments, the ledge 34 and rising surface 36 may be eliminated, such that the contact surfaces 30 are substantially flat across the inner ring 12.

A first end 42 of the sealing assembly 40 is inserted in the groove 24 to form a seal and provide contact for electrical grounding at the interface of the sealing assembly 40 and the radially outer ring 14. A second end 44 of the sealing assembly 40 is positioned for sliding or stationary contact with contact surfaces 30 in order to form a seal at the interface of the sealing assembly 40 and the radially inner ring 12. This seal acts to keep lubricant from moving outward from the area of the bearing elements 16 and to prevent the ingress of debris.

Figure 4:
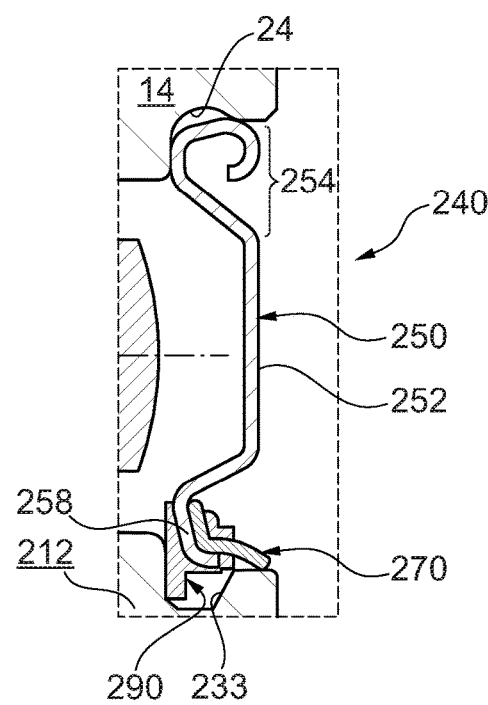
FIG. 4 is a cross-sectional view of an alternative sealing arrangement utilizing a conductive shield and molded conductive grounding element of the bearing assembly of FIG. 1.

While the radially outer ring 14 is described as including the grooves 24 and the radially inner ring 12 is described as having the contact surfaces 30, it should be understood that these features may be reversed. For example, the grooves 24 may be formed in an outwardly-facing surface of the radially inner ring 12. In some embodiments and as illustrated in FIG. 4, both the radially inner ring 12/212 and the radially outer ring 14 may include grooves 24, 233 for receiving opposing ends 42, 44 of the sealing assembly 40.

As best shown in FIG. 2, the sealing assembly 40 includes a grounding element 70, a shield 50, and a sealing element 90. The shield 50 is formed of a conductive material, for example conductive fiber or sheet metal. The sealing element 90 may be a conventional sealing material, such as rubber or polymeric material, such as nitrile rubber (NBR) or a polytetrafluoroethylene (PTFE) ring. The sealing element 90 preferably contacts both the inner ring 12 and the outer ring 14. Sealing in this manner helps to prevent lubricant from working axially outward from the area of the bearing elements 16 and undesirably increasing the impedance of the grounding element 70. At the same time, the sealing element 90 contributes to blocking materials (e.g., debris, lubricant, etc.) external to the bearing assembly 10 from penetrating the bearing assembly 10 and/or from separating the grounding element 70 from the outer ring 14.

The grounding element 70 provides or contributes to a conductive path for electrical current which is transmitted to the bearing assembly 10 via the shield 50. The grounding element 70 extends from a center of the shield 50 toward the second end 72 to the contact area 30 of the inner ring surface 12. The grounding element 70 is in direct electrically conductive contact with the shield 50 and in direct contact with the contact surface 30 of the inner ring 12. The grounding element 70 is preferably a highly conductive material such as carbon; however, other conductive materials can be used.

As illustrated in FIG. 2, the grounding element 70 is molded or attached intimately to the shield 50 as to provide sufficient electrical contact to pass current from the grounding element 70 to shield 50 and ultimately to the bearing outer ring 14 via contact at an end 58. Specifically, the leg 54 has a terminal end face 58 that contacts the inner face 28 of the groove 24 of the outer ring 14 in an electrically conductive manner. The leg 54 extends substantially perpendicularly to the longitudinal section 56. The longitudinal section 56 spans most of the distance between the outer ring 14 and the inner ring 12, but in the illustrated embodiment stops short of the contact surface 30 of the inner ring 12. The grounding element 70 also acts as a support or reinforcement for the sealing element 90.

Figure 3:
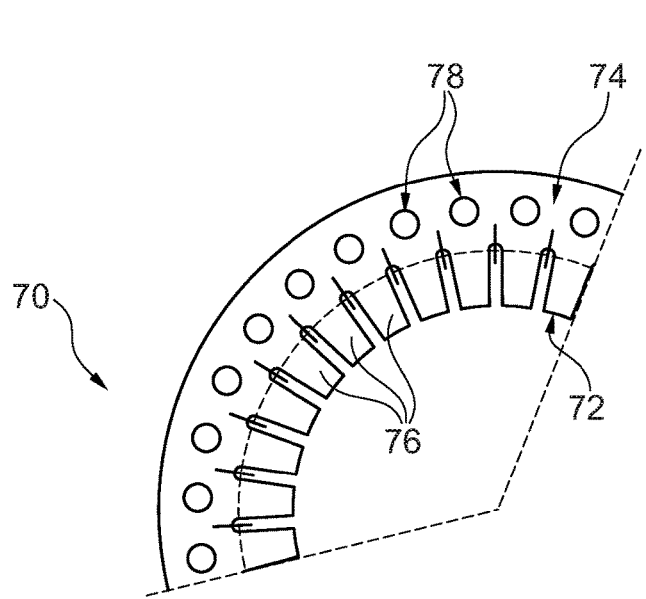
FIG. 3 is a partial side view of an electrically conductive grounding element according to an embodiment of the bearing assembly of FIG. 1.

The grounding element 70 is in direct electrically conductive contact with the inner ring 12 contact surface 30. Therefore the grounding element 70 and the shield 50 together provide a conductive path from the outer ring 14 to the inner ring 12. The grounding element 70 includes an inner section 72 that may comprise of a series of teeth 76, as shown in FIG. 3, for allowing slight flexure to compensate for relative axial and radial displacement between the inner ring 12 and the outer ring 14 which promotes the conductive contact with the inner ring 12. In the illustrated embodiment, the teeth 76 are circumferentially spaced about the grounding element 70 and extend radially inwardly from the outer section 74. The outer section 74 may define a series of circumferentially-spaced through holes 78 which allow for a through flow of sealing material 92 during formation of the sealing assembly 40 as further discussed below. The conductive grounding element 70 may be formed of carbon fiber or other suitably conductive materials.

Returning to FIG. 2, the sealing element 90, formed of sealing material 92, may engage in various ways with the shield 50 and the grounding element 70. Engagement can be by intimate contact via polymer molding or alternatively via mechanical methods. The sealing element 90 is also illustrated in FIG. 1 as extending from a first end 93 at the outer ring 14 to a second end 94 at the outer ring 14. As such, the sealing element 90 engages both the inner and outer rings 12, 14. The second end 94 includes a foot 96 for engaging the inner ring and a flange 98 for positive grease containment within the bearing while simultaneously preventing ingress of foreign contaminants.

The sealing material 92 of the sealing element 90 can be provided in a liquefied state and subsequently solidified, for example by vulcanization. For assembly, the liquefied form of sealing element 90 flows through the through holes 78 of the shield 70 to firmly capture the grounding element 70 against the shield 50. This also prevents subsequent rotation of the grounding element 70.

FIG. 4 illustrates a sealing assembly 240 with a shield 250 that also functions to conduct electricity while simultaneously sealing with the outer ring 14 due to its shape and intimate contact due to press fit from mechanical crimping. A mid portion 252 of the shield 250 extends between the inner and outer rings 212, 14. A leg 254 of the grounding element angles inwardly then curls outwardly and is press fit within the groove 24 at multiple points of contact. An end portion 258 is angled inwardly then turns outwardly, and is received by a sealing element 290 in the groove 233 of the inner ring 212. The press fit of the shield 250 can function to allow slight flexure to compensate for relative axial and radial displacement between the inner ring 212 and the outer ring 14 which promotes and maintains the conductive path between the rings.

An electrically conductive grounding element or washer 270 and the sealing element 290 are only positioned proximate the inner ring 212. In other words, the grounding element 270 and the sealing element 290 do not extend beyond a midpoint between the inner ring 212 and the outer ring 14. The sealing element 290 also receives the grounding element 270, and in a preferred embodiment the end portion 258 of the shield 250 terminates within the sealing element 290 while the grounding element 270 completes the electrical connection to the inner ring 212. The grounding element 270 and/or the press fit of the shield 250 can function to allow slight flexure to compensate for relative axial and radial displacement between the inner ring 212 and the outer ring 14, which promotes and maintains the conductive path between the rings.

In general, the sealing assembly 40 design has several guiding principles. To ensure electrical current passage from the inner ring 12 to the outer ring 14, the grounding element 70 and shield 50 should maintain contact with each ring 12, 14 and with each other. Proper electrical current passage through the sealing assembly 40 effectively provides an electrical shunt with a controlled and near constant low impedance path to ground, thus protecting against EDM damage to the bearing assembly 10. Preferably, the shield 50 will have slight contact pressure with the outer ring 14 and the grounding element 70 similarly will have a slight interference fit with the inner ring 12. Such contact pressure and interference fit ensure constant contact during usage, even when under loading or shock.

Moreover, grease from the bearing element 16 can inhibit electrical conductivity, especially if it reaches the grounding element 70. Accordingly, the sealing element 90 and/or grounding shield 50 prevent undesired grease flow. Preferably, the shield 50 is completely blocked from the interior of the bearing assembly 10 where the bearing elements 16 and grease are located.

In one example, the grounding element 70 is a washer which includes a plurality of interwoven fibers and carbon particles fused to the fibers to carry and disperse the electrical current. The washer may be felt (e.g., a stiff carbon felt) with conductive fibers (e.g., metallic fibers, etc.) arranged at various angles within the washer.

In use, the grounding element 70 and shield 50 provide a conductive path for the bearing assembly 10 which is formed between the radially inner ring 12 and the radially outer ring 14. This allows stray electrical currents to pass from the radially inner ring 12 to the radially outer ring 14, and vice versa, or from either ring to another element or grounded feature. This configuration inhibits current from arcing to or from the bearing elements 16 and races 18, 20. Keeping stray currents away from the bearing elements 16 and races 18, 20 helps to prevent EDM.

The disclosed sealing assembly 40 provides the above advantages of inhibiting EDM due to current arcs without adding significant bulk to the rolling bearing assembly 10 or complicating the assembly process. The grounding element 70 and the shield 50 are added to the sealing assembly 40 and are held in place with the sealing element 90. The process of forming and positioning the sealing element 90 thus doubles as the process of adding and affixing the grounding element 70 and the shield 50 to the bearing assembly 10.

Having thus described the presently preferred embodiments in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiments and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

PARTS LIST

10. Bearing Assembly
12. Inner Ring
14. Outer Ring
16. Bearing Elements
18. Inner Race
20. Outer Race
22. Cage
24. Groove
28. Inner Face
29. Outer Face
30. Contact Surfaces
34. Ledge
36. Rising Surface
38. Chamfered Edge
40. Sealing Assembly
42. First End
44. Second End
50. Shield
54. Leg
56. Longitudinal Section
58. End Face
70. Grounding Element
72. Second End
74. Outer Section
76. Teeth
78. Through Holes
90. Sealing Element
92. Sealing Material
93. First End
94. Second End
96. Foot
98. Flange
212. Inner Ring
233. Groove
240. Sealing Assembly
250. Shield
252. Mid Portion
254. Leg
258. End Portion
270. Grounding Element
290. Sealing Element

What is claimed is:

1. A rolling bearing assembly, comprising:
a first ring including a first race;
a second ring including a second race;
a plurality of rolling elements in rolling contact with the first and second races; and a sealing assembly including a first end in contact with the first ring and a second end in contact with the second ring, the sealing assembly including:
- a grounding element in contact with the first ring,
- a shield in contact with the second ring, and
- a sealing element affixed to the grounding element and the shield, the grounding element and the shield create an electrically conductive path between the first ring and the second ring, and the grounding element and the sealing element provide a seal between the first ring and the second ring.

2. The rolling bearing assembly of claim 1, wherein the first ring includes a groove which receives a leg of the grounding element.

3. The rolling bearing assembly of claim 2, wherein the first ring is a radially outer ring.

4. The rolling bearing assembly of claim 2, wherein the first ring is a radially inner ring.

5. The rolling bearing assembly of claim 2, wherein a terminal end face of the leg of the grounding element contacts an inner face of the groove.

6. The rolling bearing assembly of claim 2, wherein the second ring includes a contact surface which radially opposes the groove and which is in contact with the sealing element.

7. The rolling bearing assembly of claim 2, wherein the second ring includes a second groove which radially opposes the groove of the first ring and which is in contact with the sealing element.

8. The rolling bearing assembly of claim 1, wherein the grounding element includes a plurality of circumferentially spaced through holes, and the sealing element extends through the through holes to affix the grounding element firmly to the shield.

9. A method of making the bearing assembly of claim 8, comprising flowing a sealing material through the through holes of the grounding element and vulcanizing the sealing material to form the sealing element.

10. The rolling bearing assembly of claim 1, wherein the grounding element includes a plurality of teeth for engaging the first ring with an interference fit.

11. The rolling bearing assembly of claim 10, wherein the teeth extend radially inward from the grounding element.

12. The rolling bearing assembly of claim 1, wherein at least one of the grounding element or the shield compensate for relative axial and radial displacement between the inner ring and the outer ring to maintain the electrically conductive path.

13. A bearing assembly, comprising:
- a first ring including a first race;
- a second ring including a second race;
- a plurality of rolling elements in rolling contact with the first and second races; and
- a sealing assembly including a first end in contact with the first ring and a second end in contact with the second ring, the sealing assembly including:
  - a washer including a plurality of teeth in contact with the first ring,
  - a shield in contact with the second ring, and
  - a sealing element affixed to the washer and the shield, the washer and the shield create an electrically conductive path between the first ring and the second ring, and the washer and the sealing element provide a seal between the first ring and the second ring.

14. The bearing assembly of claim 13, wherein the plurality of teeth are circumferentially spaced about the washer.

15. The bearing assembly of claim 13, wherein the plurality of teeth extend radially inward from an outer section of the washer.

16. The bearing assembly of claim 13, wherein the washer includes a plurality of interwoven conductive fibers or other conductive material such as metal.

17. A sealing assembly for sealing between a first ring and a second ring of a bearing, the sealing assembly comprising:
- a first end that contacts the first ring and a second end that contacts the second ring;
- a shield that contacts the first ring and extends into a groove of the second ring;
- a grounding element that contacts the first ring; and
- a sealing element that contacts the first ring and the shield,
- wherein the grounding element and the shield create an electrically conductive path between the first ring and the second ring, and the shield and the sealing element provide a seal between the first ring and the second ring.

18. The bearing assembly of claim 17, wherein the grounding element and the sealing element are only positioned proximate the first ring.

* * * * *